United States Patent [19]

Stoops et al.

[11] Patent Number: 5,739,838
[45] Date of Patent: Apr. 14, 1998

[54] PULSE WIDTH MODULATION METHOD FOR A PARALLEL INPUT PRINT HEAD

[75] Inventors: James T. Stoops, Walworth; David A. Johnson, Rochester, both of N.Y.

[73] Assignee: Eastman Kodak Company, Rochester, N.Y.

[21] Appl. No.: 425,278

[22] Filed: Apr. 20, 1995

[51] Int. Cl.$^6$ .................................................. B41J 2/35
[52] U.S. Cl. .................................. 347/211; 347/183
[58] Field of Search .............................. 347/211, 183, 347/184, 180, 181, 182, 237, 240; 358/298

[56] References Cited

U.S. PATENT DOCUMENTS

| | | | |
|---|---|---|---|
| 4,621,271 | 11/1986 | Brownstein | 346/76 PH |
| 4,806,950 | 2/1989 | Sekine et al. | 346/76 PH |
| 4,819,008 | 4/1989 | Nagato et al. | 358/298 |
| 4,951,152 | 8/1990 | Suzuki et al. | 358/298 |
| 4,994,822 | 2/1991 | Caine | 346/76 PH |
| 5,604,527 | 2/1997 | Ng et al. | 347/240 |

FOREIGN PATENT DOCUMENTS

| | | | |
|---|---|---|---|
| 4-282263 | 10/1992 | Japan | 347/211 |
| 4-320860 | 11/1992 | Japan | 347/211 |

Primary Examiner—Huan H. Tran
Attorney, Agent, or Firm—Milton S. Sales

[57] ABSTRACT

An apparatus and method for generating all of the print levels represented by an image data signal using a parallel input print head which has an input data bus which is narrower than the image data signal involves processing and printing image data multiple times. Each time the image data is processed, it is reduced from its original width down to the width which the print head can accept. The process includes the steps of determining the minimum number of times $L_{min}$ that the print head must be loaded to accomplish printing using the full width of the image data signal; processing the image data L times, where $L \geq L_{min}$, to produce L output signals that (1) are no wider than the width of the input data bus and (2) have values such that the sum of the values of the L output signals equals the value of the input data signal; and using the L output signals to drive the print head.

5 Claims, 8 Drawing Sheets

PULSE WIDTH MODULATION METHOD FOR A PARALLEL INPUT PRINT HEAD

CROSS-REFERENCE TO RELATED APPLICATION

Reference is made to commonly assigned, co-pending U.S. patent application Ser. No. 08/425,276 filed Apr. 20, 1997 in the name of J. Stoops concurrently herewith.

BACKGROUND OF THE INVENTION

1. Technical Field

This invention relates generally to image printers having parallel input print heads.

2. Background Art

A thermal printer is one commercial example of an image printer that has traditionally used serial input print heads which receive one or more single-bit wide data input. FIG. 1 illustrates a typical configuration of a thermal printer, such as those adapted for dye or wax transfer from donor media to image receiver media. Data is clocked into a series of shift registers 10 by a HEADCLK signal. The data stored in each shift register is then transferred to a respective latch register 12 by activating a LATCH signal. Heater elements 14 may then be activated according to the data stored in the latch registers by applying an ENABLE signal to a series of AND gates 16.

The images to be printed are often multiple bits per pixel. Because conventional serial input print heads are not able to store all of the information associated with a line of image data at one time, data must be loaded to the serial input print head multiple times to reproduce a multi-bits per pixel image. Over the years, many techniques have been developed to print multi-bit images with these serial input print heads. See for example U.S. Pat. No. 4,621,271, which issued to S. Brownstein on Nov. 4, 1986; No. 4,994,822, which issued to H. Cane on Feb. 19, 1991; No. 4,806,950, which issued to K. Sekine et al. on Feb. 21, 1989; and No. 4,951,152, which issued to K. Suzuki et al. on Aug. 21, 1990.

A system which incorporates a serial input print head is shown in FIG. 2. Given image data which is N bits wide, prior art modulation techniques require that data be loaded into the print head between N and $2^N$ times to achieve the $2^N$ possible print densities. When using a serial input print head, the number of times a print head is loaded is a primary factor in determining print speed. Therefore, prior art modulation techniques which only require N print head loads to achieve $2^N$ print densities typically provide fast print times, but have exhibited poor image quality. Modulation techniques which require $2^N$ print head loads generally exhibit higher image quality but require longer printing times. It has therefore been desirable to find a print head architecture and modulation technique which provides both fast printing times and high image quality.

Recently, parallel input print heads which accept more than a single bit wide data bus have been introduced into the marketplace. A typical architecture for such a print head is shown in FIG. 3. A series of shift registers 18 store image data. A series of 8-bit DOWN counters 20 and flip flops 22 serve as a means for modulating the multi-bit image data on the print head itself. A system which incorporates such a parallel input print head is shown in FIG. 4.

As would be expected, the control of the parallel input print head differs somewhat from controlling a serial input print head. FIG. 5 illustrates a typical control sequence. A DATA signal 24 is clocked into the print head's shift registers 18 (FIG. 3), N bits at a time, by pulsing a HEADCLK signal 26. Once an entire line of data has been loaded into the print head, a LATCH~ signal 28 is pulsed LOW to load the contents of shift registers 18 into DOWN counters 20. After the counters have been loaded, flip flops 22 may be set by pulsing a SET~ signal 30 LOW. After setting the flip flops, respective heater elements 32 may be energized by activating an ENABLE~ signal 34. Pulse width modulation is achieved with this system by clocking a COUNTCLK signal 36 while ENABLE~ signal 34 is active. When an individual counter 20 reaches zero, the carry output of the counter is activated, and the associated flip flop's output is cleared; turning OFF the respective one of the heater elements 32.

When the number (N) of bits in the image data is less than or equal to the number (M) of bits in the parallel print head's input bus, the parallel print head directly provides a means of printing all $2^N$ print levels represented by the image data. High quality images may be printed at fast print times. However, these print heads do not directly provide a means of achieving all $2^N$ print levels when the number of bits in the image data is greater than the number of bits in the parallel print head's data input bus (N≥M). These print heads require a new method for handling image data which has more print levels than the parallel input print head is capable of directly printing.

DISCLOSURE OF THE INVENTION

The present invention provides an apparatus and method for generating all of the print levels represented by an image data signal using a parallel input print head which has an input data bus which is narrower than the image data signal.

According to a feature of the present invention, image data is processed and printed multiple times. Each time the image data is processed, it is reduced from its original N bits down to the M bits which the print head can accept.

According to another feature of the present invention, a process for printing an image data signal, of predetermined width and value, using a parallel input print head which has an input data bus which is narrower than the image data signal width, includes the steps of determining the minimum number of times $L_{min}$ that the print head must be loaded to accomplish printing using the full width of the image data signal; processing the image data L times, where $L \geq L_{min}$, to produce L output signals that (1) are no wider than the width of the input data bus and (2) have values such that the sum of the values of the L output signals equals the value of the input data signal; and using the L output signals to drive the print head.

According to still another feature of the present invention, a process for printing an image data signal which is N data bits wide and generating $2^N$ print levels to be applied to a parallel input print head which has an M-bit wide input data bus, where N≥M, includes the steps of determining the minimum number of times $L_{min}$ that the print head must be loaded with data to achieve all of the print levels represented by the image data signal; processing the image data L times, where $L \geq L_{min}$, to produce L output signals that (1) are M bits wide or less and (2) have values such that the sum of the values of the L output signals equals the value of the input data signal; and using the L output signals to drive the print head. The value of $L_{min}$ may be calculated as $$L_{min} \geq \frac{2^N - 1}{2^M - 1}.$$

According to yet another feature of the present invention, a printer for printing $2^N$ print levels represented by an image data signal which is N data bits wide includes a parallel-input print head having an M-bit wide parallel data input bus, where $N \geq M$; and an image processor adapted to process the same data set for each of L print head loads and to output a series of M-bit wide signals to the print head, where L is the minimum number of times that the print head must be loaded with data to achieve all $2^N$ print levels represented by the image data signal.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of a thermal printer, it will be noted that the invention can be used with other types of imaging apparatus.

In all of the following discussions it will be assumed that the number of bits in the image data is greater than the number of bits in the input data bus of the parallel print head unless otherwise noted.

Figure 1:
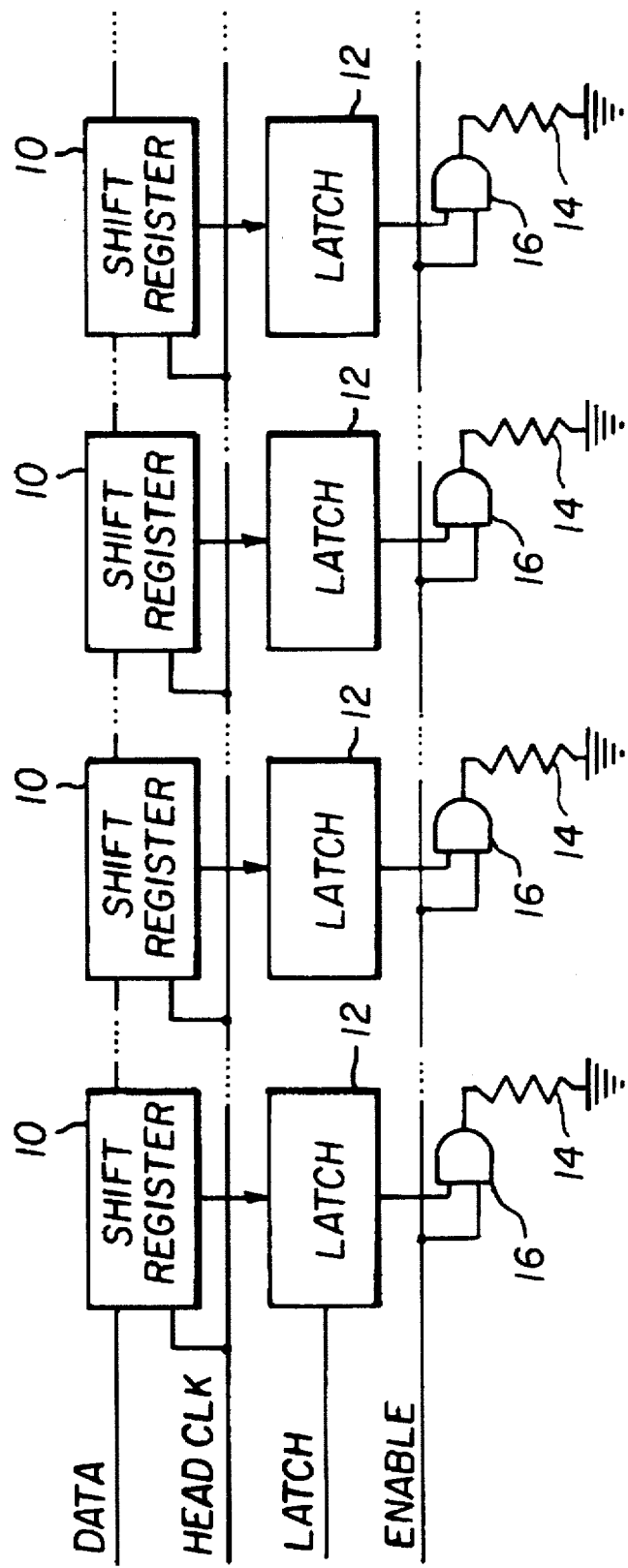
FIG. 1 is a block diagram of a serial input print head according to the prior art.
Figure 2:
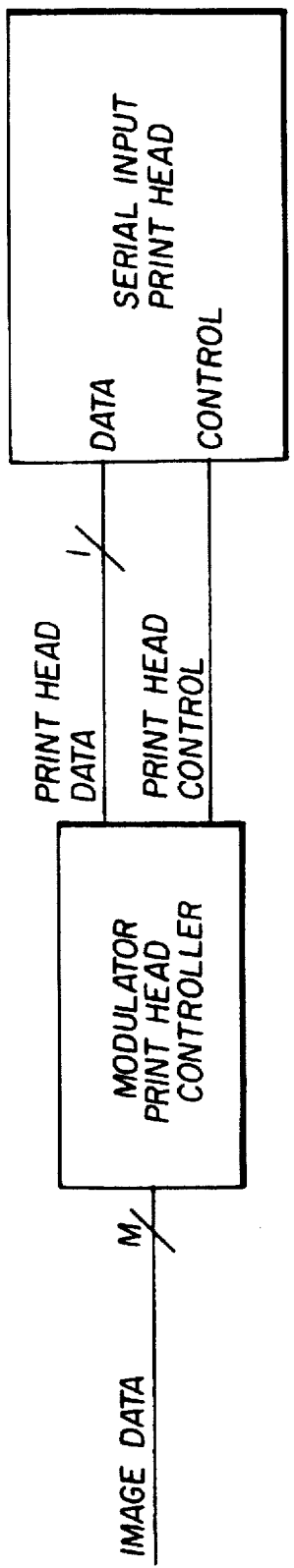
FIG. 2 is a block diagram of a system for the serial input print head of FIG. 1 according to the prior art.
Figure 4:
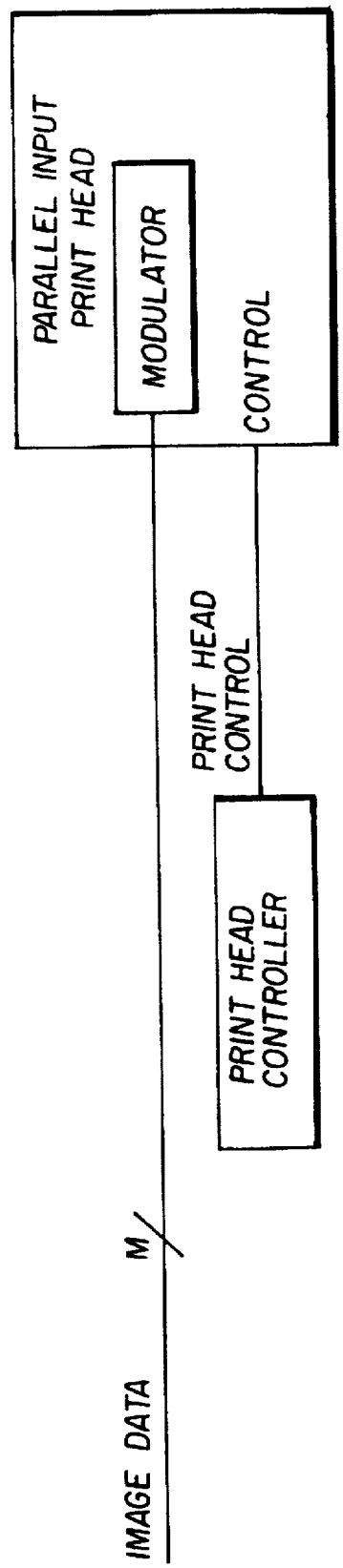
FIG. 4 is a block diagram of a system for the parallel input print head of FIG. 3 according to the prior art.
Figure 3:
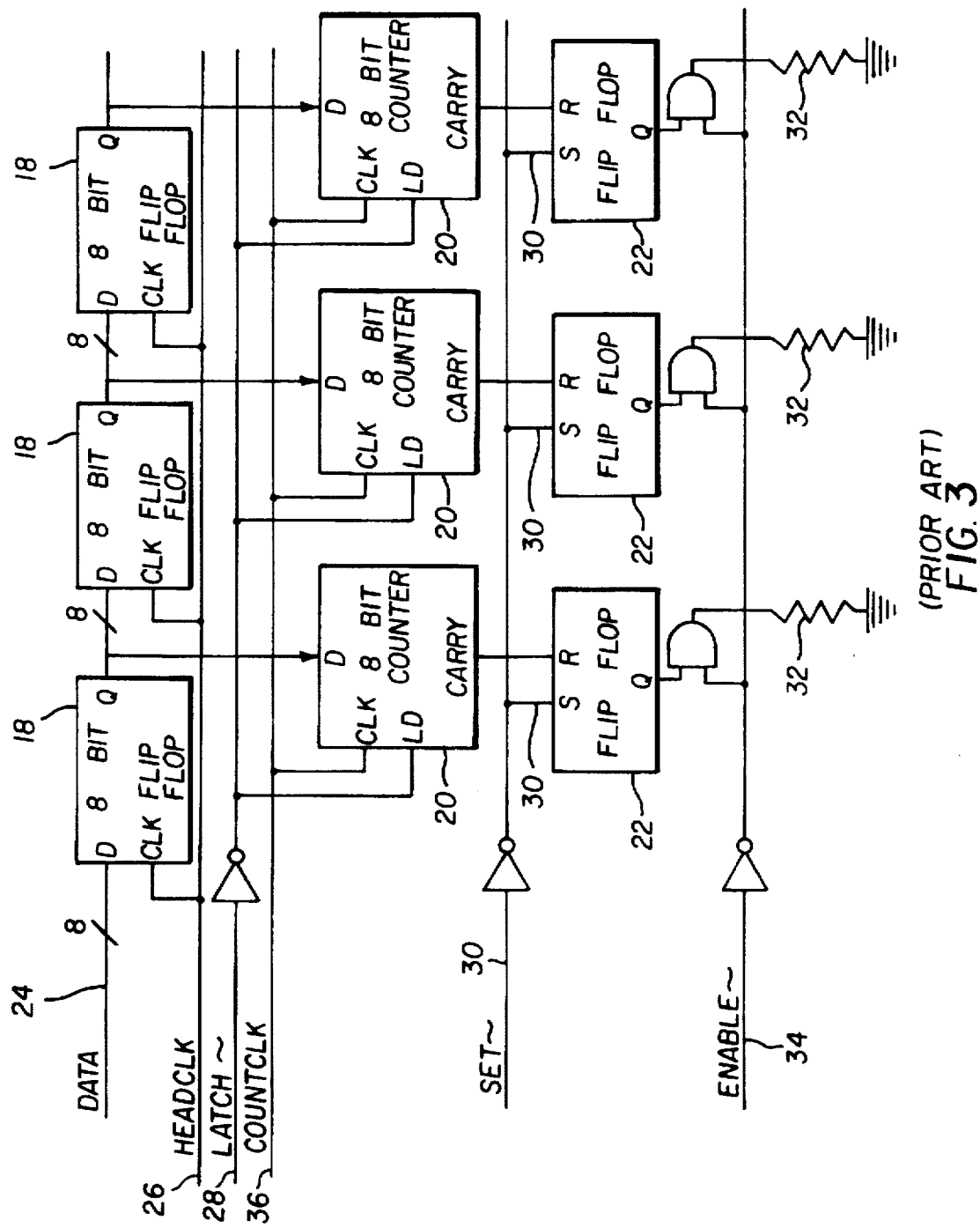
FIG. 3 is a block diagram of a parallel input print head which may be used with the present invention.
Figure 5:
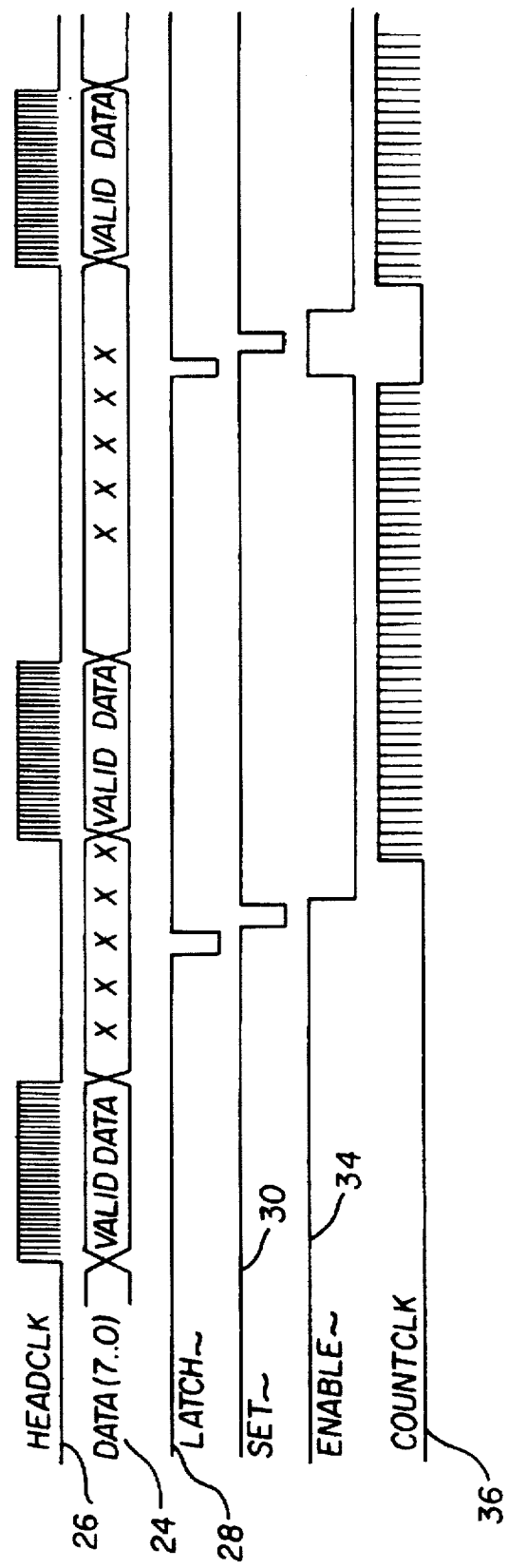
FIG. 5 is a timing diagram for printing with a parallel input print head.
Figure 6:
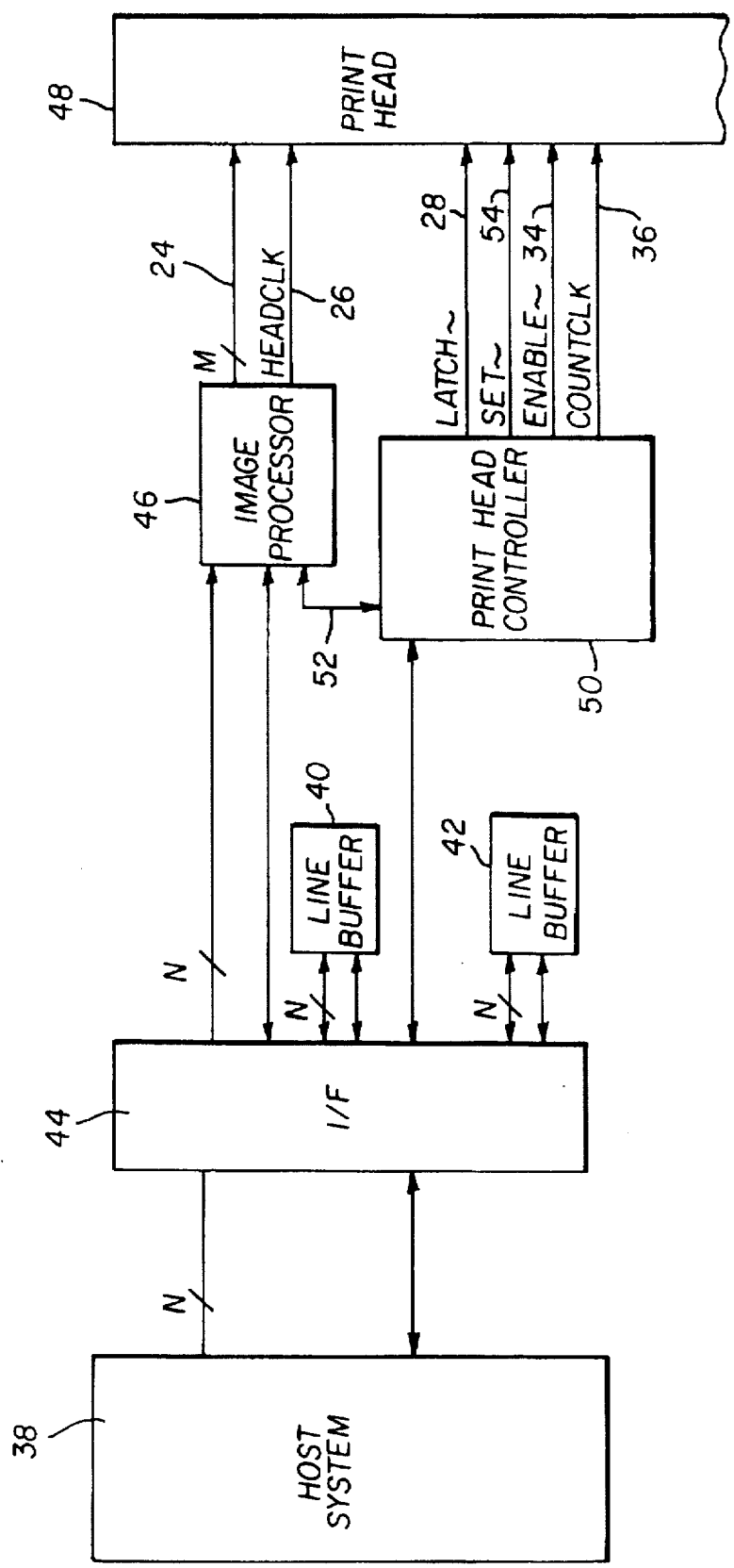
FIG. 6 is a block diagram of the printing apparatus according to the present invention.

Referring to FIG. 6, N-bit image data is first input into from a host system 38 to one of a pair of line buffers 40 and 42 via a host-image processor interface 44. Host-data interface 44 operates as a switching mechanism to connect one of the line buffers 40 and 42 to host system 38 while the other line buffer is connected as the input to a image processor 46. By switching the connections of the two line buffers, image data may be supplied to image processor 46 from one line buffer, while receiving next line image data into the other line buffer at the same time. For example, while image data is being supplied from host system 38 to line buffer 40, line buffer 42 is available to supply image data to image processor 46. At the completion of printing of the image data in line buffer 42, the image data in line buffer 40 is then used for printing, while next line data is input into line buffer 42. These line buffers and their "ping pong" configuration provide an efficient means of providing the image data to a print head 48 (as illustrated in FIG. 3) over the multiple print head loads required for the printing of the $2^N$ print levels. Strictly speaking neither line buffers 40 and 42, nor their ping pong configuration, are required for this technique to work properly. However, elimination of these devices will require that host system 38 supply the image data multiple times to print head 48, which may be undesirable for some applications.

Once a single line of image data has been stored into one of line buffers 40 and 42, the printing process may begin. The printing processes may be viewed as two synchronized processes: a print head loading process and a modulation process. A print head controller 50 is responsible for controlling the modulation process, and image processor 46 is responsible for loading the print head. The synchronization of the two processes is controlled by print head controller 50, which controls the overall system timing. Once print head controller 50 commands a print head load to start, the image data which is stored in line buffers 40 and 42 is written to image processor 46. The image processor splits the image data and writes the appropriate group of bits to print head 48 by toggling HEADCLK signal 26. After the entire line of data has been processed and loaded into print head 48, image processor 46 signals print head controller 50 via a control bus 52 that the print head load has been completed.

Once the initial print head load has been completed, LATCH~ signal 28 is pulsed to load the contents of the shift registers into the print head's DOWN counters 20 (FIG. 3). The print head controller then signals for the next print head load to begin. After the counters have been loaded and LATCH~ signal 28 is de-asserted, the flip flops are set by pulsing a SET~ signal 54 LOW. After setting the flip flops, heater elements 32 are energized by activating ENABLE~ signal 34. Pulse width modulation is achieved with this systemby clocking COUNTCLK signal 36 while ENABLE~ signal 34 is active. When an individual counter 20 reaches ZERO, the carry output of the counter is activated and the associated flip flop's output is cleared, turning off the heater element 32. When all counters have reached ZERO, the modulation process has been completed.

Figure 7:
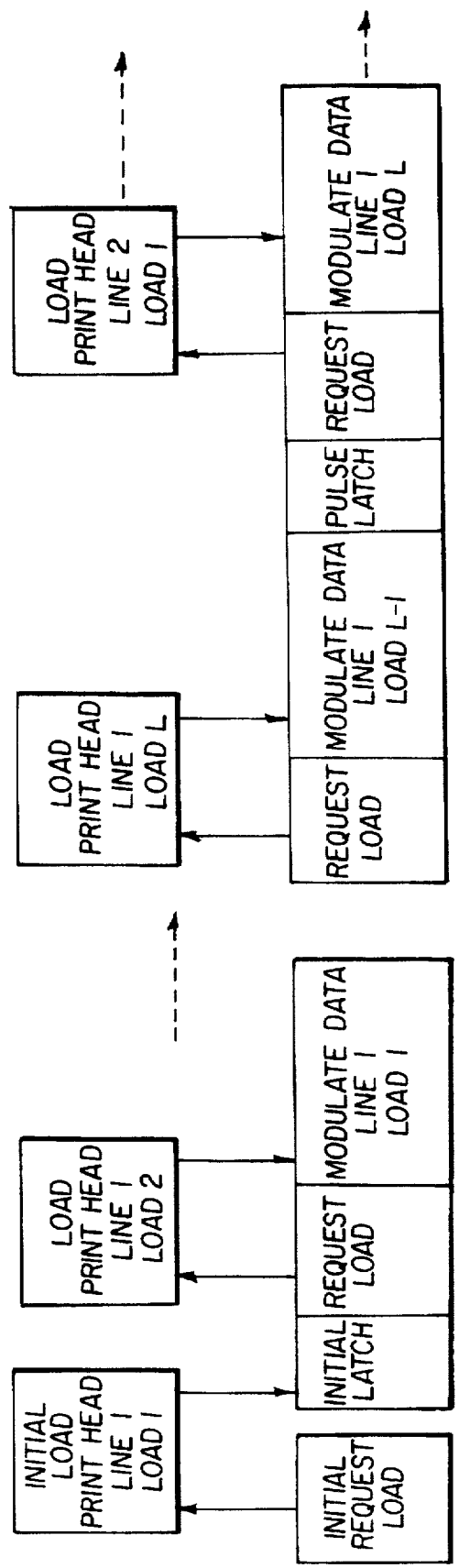
FIG. 7 illustrates the synchronization of the print head loading and modulation.

Meanwhile, modulation of the next set of data to be printed has been processed and loaded into the print head's shift registers 18. This data is loaded into down counters 20 by pulsing LATCH~ signal 28. Print head controller 50 then signals for the next print head load to begin. This process continues until the entire image has been printed. It should be noted that, after the initial load of the print head 48, the synchronization of the two processes does not need to discriminate between print lines. The synchronization of the two processes is illustrated in FIG. 7.

Because the image data signal contains more bits than the input bus of print head 48, it will be necessary to load data to the print head more than once for each print line to achieve all of the print levels represented by the image data. Letting "L" represent the number of times print head 48 is loaded with data for the printing of each line of image data, the minimum value $L_{min}$ for L may be calculated (as will be shown below) as:

$$L_{min} \geq \frac{2^N - 1}{2^M - 1} \quad (1)$$

where $L_{min}$ is the smallest integer value to satisfy the inequality, and $$L \geq L_{min} \quad (2)$$

For each of the L print head loads, image data which has been stored in one of the line buffers 40 and 42, is processed and loaded into print head 48. Although the same data set is processed by image processor 46 for each of the L print head loads, the output of the image processor changes dependent on which of the L loads is currently taking place. By properly processing the image data, all $2^N$ print levels may be achieved.

Figure 8:
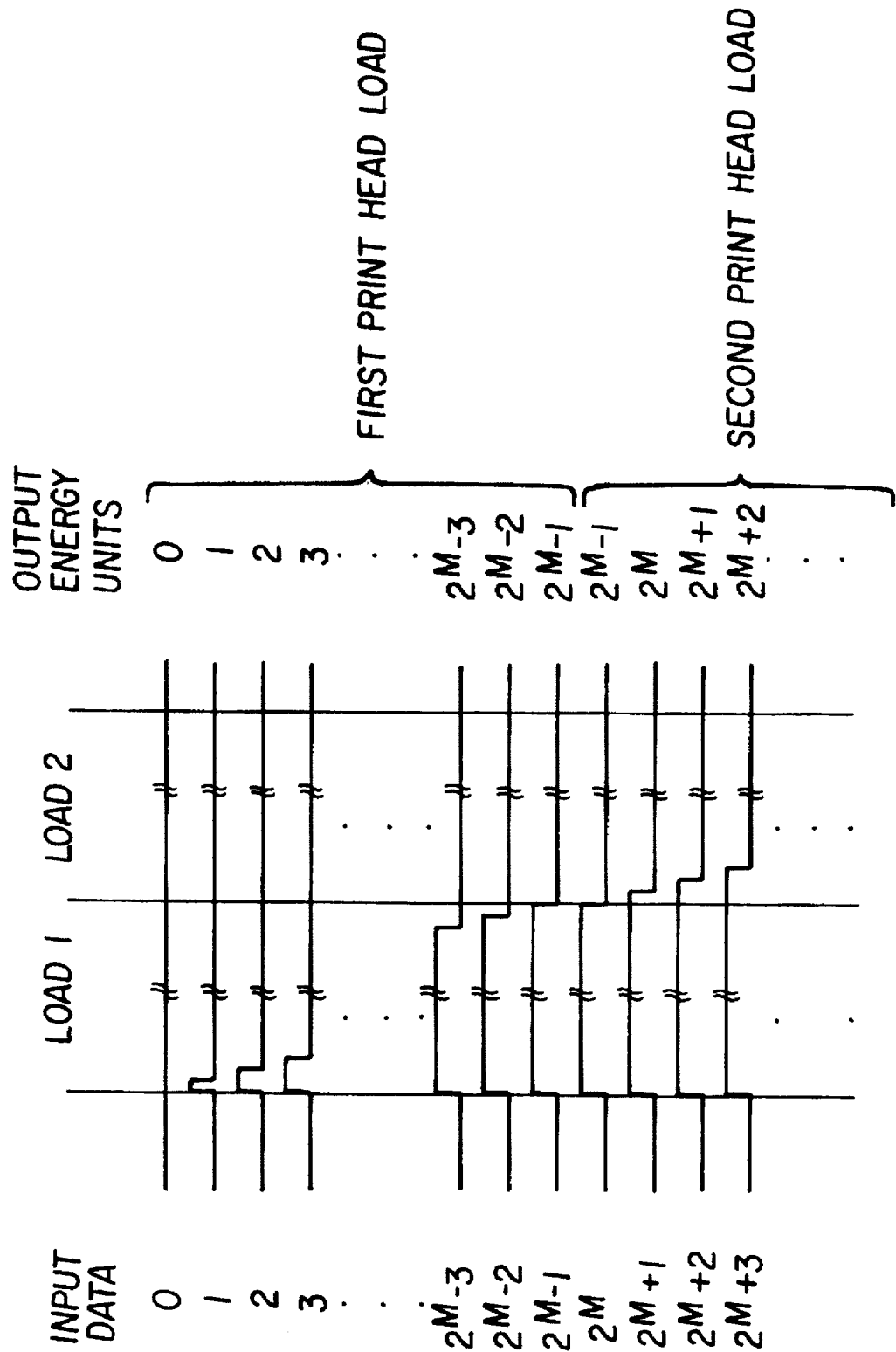
FIG. 8 illustrates the energy levels provided by each print head load.

In order to accurately print an image represented by N-bit data, $2^N$ unique energy levels must be provided. A parallel input print head with an M bit input bus is capable of providing $2^M$ unique print levels. However, these $2^M$ levels are comprised of one zero energy print level and $2^M-1$ non-zero energy levels. Therefore while a single print head load can provide $2^M$ print levels, two print head loads can only print $2^{M+1}-1$ print levels with energy outputs ranging from zero to $2^{M+1}-2$. The zero energy level output must be compensated for when printing $2^N$ levels over several loads of the print head. Ignoring the fact that the $2^M$ energy levels include a zero energy level will cause two different input image data values to map to the same output energy. FIG. 8 illustrates this problem. As shown in FIG. 8, the first load of the print head would provide energy levels zero through $2^M-1$. The second load of the print head 48 provides energy levels $2^M-1$ through $2^{M+1}-2$. Because the lowest energy output of the second head load is zero, the energy output maps to the highest energy output of the previous head load.

Therefore, to provide all of the print levels represented by the image data the following inequality must be satisfied.

$$L \cdot (2^M - 1) + 1 \geq 2^N \quad (3)$$

where L is the number of print head loads per image line, N is the number of bits in image data, and M is the number of bins in print head input bus. Solving for L yields:

$$L \geq \frac{2^N - 1}{2^M - 1} \quad (4)$$

The smallest integer value of L which satisfies the inequality is the minimum number $L_{min}$ of print head loads which will provide all of the print levels for the N bit wide image data. Letting k represent the $k^{th}$ of $L_{min}$ head loads per line, an algorithm which will provide the necessary processing is:

$$\text{out} = 0 \leq \text{input} - (k-1)(2^M - 1) \leq (2^M - 1) \quad (5)$$

where k=1, 2, . . . , $L_{min}$ and where it is understood that the inequality on the right hand side of the equation represents a clipping of the output between zero and $2^M-1$.

It is recognized that the preceding algorithm is only one of many algorithms which may be used to determine the distribution of the energy. As an example, Table 1 shows the output of image processor 46 versus input image data 60 for a system which has 3-bit (N) input data and a 2-bit (M) parallel input print head. For this example the number of print head loads required equals three in accordance with Equation 4.

TABLE 1

Image Processor Output Vs. Image Data Input for multiple print head loads

| First Load | | Second Load | | Third Load | |
|---|---|---|---|---|---|
| Input | Output | Input | Output | Input | Output |
| 0 | 0 | 0 | 0 | 0 | 0 |
| 1 | 1 | 1 | 0 | 1 | 0 |
| 2 | 2 | 2 | 0 | 2 | 0 |
| 3 | 3 | 3 | 0 | 3 | 0 |
| 4 | 3 | 4 | 1 | 4 | 0 |
| 5 | 3 | 5 | 2 | 5 | 0 |
| 6 | 3 | 6 | 3 | 6 | 0 |
| 7 | 3 | 7 | 3 | 7 | 1 |

Figure 9:
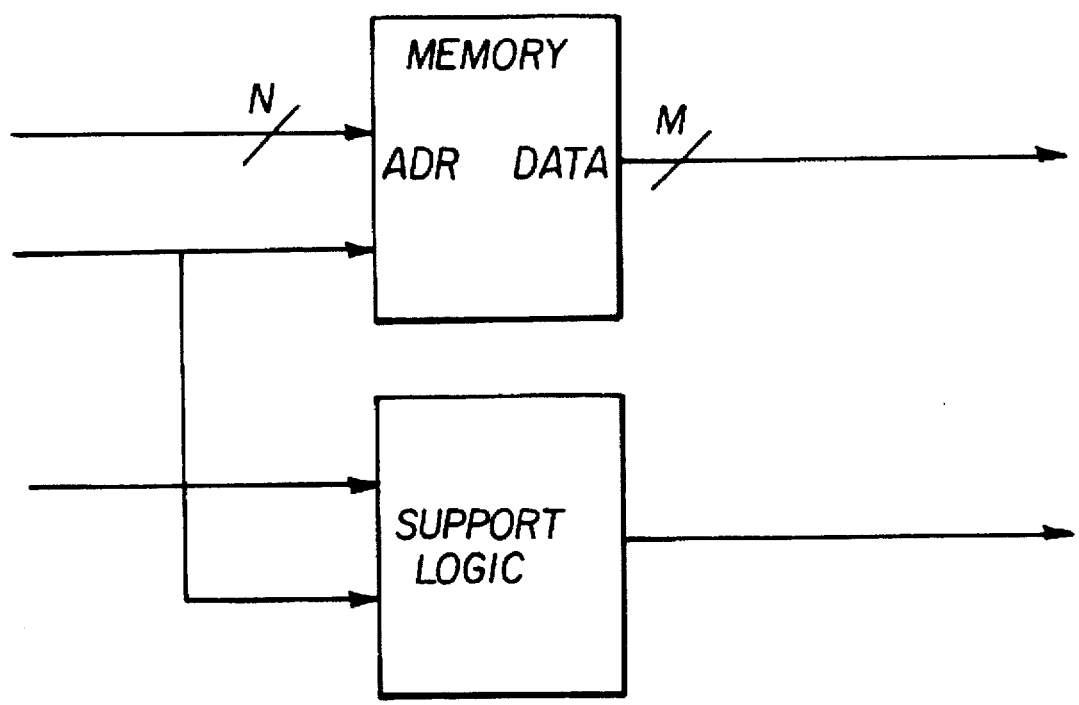
FIG. 9 is a functional diagram of an image processor that is part of the apparatus of FIG. 6.

The functionality of image processor 46 may be performed by a memory and simple support logic as shown in FIG. 9.

From the above, it can be appreciated that the present invention consists of an apparatus and techniques for receiving image data which is N data bits wide and generating $2^N$ print levels given a print head with an M bit wide parallel data bus, where N>M. This invention allows the generation of more print levels than are possible from the prescribed use of the print head. Over the printing of a single line of image data, this invention allows the energy to be distributed in various ways.

The invention has been described in detail with particular reference to preferred embodiments thereof, but it will be understood that variations and modifications can be effected within the spirit and scope of the invention.

What is claimed is:

1. A process for printing an image data signal, of predetermined width and value, using a parallel input print head which has an input data bus which is narrower than the image data signal width, said process comprising:

determining the minimum number of times $L_{min}$ that the print head must be loaded to accomplish printing using the full width of the image data signal;

processing the image data L times, where $L \geq L_{min}$, to produce L output signals that (1) are no wider than the width of the input data bus and (2) have values such that the sum of the values of the L output signals equals the value of the input data signal; and using the L output signals to drive the print head.

2. A process for printing an image data signal, of predetermined width and value, using a parallel input print head which has an input data bus which is narrower than the image data signal width, said process comprising:

determining the minimum number of times $L_{min}$ that the print head must be loaded with data to achieve all of the print levels represented by the image data signal;

processing the image data L times, where $L \geq L_{min}$, to produce L output signals that (1) are no wider than the width of the input data bus and (2) have values such that the sum of the values of the L output signals equals the value of the input data signal; and using the L output signals to drive the print head.

3. A process for printing an image data signal which is N data bits wide and generating $2^N$ print levels to be applied to a parallel input print head which has an M-bit wide input data bus, where $N \geq M$, said process comprising:

determining the minimum number of times $L_{min}$ that the print head must be loaded with data to achieve all of the print levels represented by the image data signal;

processing the image data L times, where $L \geq L_{min}$, to produce L output signals that (1) are M bits wide or less and (2) have values such that the sum of the values of the L output signals equals the value of the input data signal; and using the L output signals to drive the print head.

4. A process as set forth in claim 3 wherein $L_{min}$ is calculated as $$L_{min} \geq \frac{2^N - 1}{2^M - 1}.$$

5. A printer for printing $2^N$ print levels represented by an image data signal which is N data bits wide; said printer comprising:

a parallel-input print head having an M-bit wide parallel data input bus, where $N \geq M$; and an image processor adapted to process the same data set for each of L print head loads and to output a series of M-bit wide signals to the print head, where L is the minimum number of times that the print head must be loaded with data to achieve all $2^N$ print levels represented by the image data signal.

* * * * *